United States Patent
Ito

(10) Patent No.: US 7,978,803 B2
(45) Date of Patent: Jul. 12, 2011

(54) SEMICONDUCTOR DEVICE

(75) Inventor: Makoto Ito, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1201 days.

(21) Appl. No.: 11/334,490

(22) Filed: Jan. 19, 2006

(65) Prior Publication Data

US 2007/0047685 A1   Mar. 1, 2007

(30) Foreign Application Priority Data

Aug. 25, 2005   (JP) .................. 2005-244561

(51) Int. Cl.
*H04L 7/00* (2006.01)
(52) U.S. Cl. ........................ 375/372; 375/371
(58) Field of Classification Search .......... 375/372, 375/371, 354; 327/141; 714/12; 370/503
See application file for complete search history.

(56) References Cited

U.S. PATENT DOCUMENTS

| | | | |
|---|---|---|---|
| 4,941,156 A | 7/1990 | Stern et al. | |
| 5,915,130 A | 6/1999 | Kim | |
| 6,414,609 B1 | 7/2002 | Zukawa et al. | |
| 6,810,454 B2 * | 10/2004 | Kondo et al. | 710/110 |
| 6,922,213 B2 * | 7/2005 | Yamagata | 348/423.1 |
| 7,151,811 B2 * | 12/2006 | Aubree et al. | 375/360 |
| 2004/0095935 A1 | 5/2004 | Connor | |
| 2005/0111446 A1 | 5/2005 | Greaves | |

FOREIGN PATENT DOCUMENTS

| | | |
|---|---|---|
| EP | 0 695 063 A2 | 1/1996 |
| JP | 10-126427 A | 5/1998 |
| JP | 2001-162901 A | 6/2001 |
| JP | 2002-312158 A | 10/2002 |
| WO | 88/01118 A3 | 2/1988 |
| WO | 00/08800 A2 | 2/2000 |

* cited by examiner

*Primary Examiner* — Shuwang Liu
*Assistant Examiner* — Helene Tayong
(74) *Attorney, Agent, or Firm* — Arent Fox LLP

(57) ABSTRACT

An improved reception port for receiving packet data based on the IEEE 1394 standard. The reception port includes a synchronization FIFO memory for receiving reception data in accordance with a reception clock signal and synchronizing the reception data with an internal clock signal, a decoder for decoding the synchronized reception data, and a shaping FIFO memory for outputting the decoded reception data at a fixed timing.

14 Claims, 6 Drawing Sheets

SEMICONDUCTOR DEVICE

CROSS-REFERENCE TO RELATED APPLICATIONS

This application is based upon and claims the benefit of priority from the prior Japanese Patent Application No. 2005-244561, filed on Aug. 25, 2005, the entire contents of which are incorporated herein by reference.

BACKGROUND OF THE INVENTION

The present invention relates to a semiconductor device, and more particularly, to a data reception device for receiving packet data based on the IEEE 1394 standard.

FIG. 1 is a schematic block diagram of a conventional reception port RP incorporated in a device for transmitting and receiving packet data in compliance with the IEEE 1394 standard. A decoder 1 receives reception data Din and a reception clock signal clk1, decodes the coded reception data Din in accordance with the reception clock signal clk1, and descrambles the reception data Din.

A synchronization-shaping first-in first-out (FIFO) memory 2 receives the decoded reception data Dde. The synchronization-shaping FIFO memory 2 performs a synchronization process and a data shaping process on the reception data Dde. More specifically, the synchronization-shaping FIFO memory 2 synchronizes the reception data Dde with an internal clock signal clk2 and data-shapes the reception data Dde so that it is output to an internal circuit in fixed cycles.

FIG. 2 is a timing chart showing the synchronization operation of the decoder 1 and the synchronization-shaping FIFO memory 2. The decoder 1 sequentially decodes the reception data Din in packet units data1 to datan in accordance with the reception clock signal clk1 and provides the decoded reception data Dde to the synchronization-shaping FIFO memory 2. The decoding process requires time t1 corresponding to, for example, three cycles of the reception clock signal clk1.

Next, the synchronization-shaping FIFO memory 2 synchronizes the reception data Dde with the internal clock signal clk2 and provides the synchronized reception data Dsc to the internal circuit. The synchronization process requires time t2 corresponding to two cycles of the internal clock signal clk2. The reception clock signal clk1 is set at 12.288 MHz, 24.576 MHz, or 49.152 MHz depending on the device. The internal clock signal clk2 is set at, for example, 100 MHz.

FIG. 3 shows a data string of each packet of the reception data Dde that is provided to the synchronization-shaping FIFO memory 2. The reception data Dde is transmitted in packets. Each packet of the reception data Dde sequentially includes an idle signal, a request signal, DATA PREFIX, packet data, and DATA END. After the transmission of one packet, the idle signal of the next packet is provided to the synchronization-shaping FIFO memory 2.

The segments of DATA PREFIX, the packet data, and the DATA END each have a standardized data length (byte length). During data transfer, dropout errors of the data segments having the standardized data lengths are not allowed. The data lengths of the idle signal and the request signal do not have to be determined.

In the synchronization-shaping FIFO memory 2, the reception data Dde is synchronized with the internal clock signal clk2 and sequentially stored in the shaping FIFO memory. The synchronized reception data Dsc stored in the shaping FIFO memory is shaped so that the shaped reception data Dsu is provided sequentially in fixed bytes to the internal circuit at predetermined cycles.

Japanese Laid-Open Patent Publication No. 1-500950 describes a reception device that enables clock synchronization without any dropout errors of input data bits. The reception device includes a FIFO memory, for storing an input data signal, and a synchronization unit, for controlling the delay of an output from the FIFO memory until the data signal is synchronized with a clock signal.

SUMMARY OF THE INVENTION

In the reception port shown in FIG. 1, the decoder 1 decodes the reception data Din in response to the reception clock signal clk1. The decoding process requires time t1, which corresponds to three cycles of the reception clock signal clk1. This lengthens the time t1 required for the decoding when the frequency of the reception clock signal clk1 is lower than the frequency of the internal clock signal clk2. Thus, the repeat time required for transferring the reception data is lengthened. Further, a change in the reception clock signal clk1 varies the time t1 required for the decoding.

The data string of the reception data Dsc synchronized by the synchronization-shaping FIFO memory 2 may have a data dropout error as shown in FIG. 4 when storing the data string in the shaping FIFO memory.

More specifically, the reception clock signal clk1 may change and deviate the timing at which data is stored in the shaping FIFO memory from the timing at which data is output from the shaping FIFO memory. As a result, the amount of data stored in the shaping FIFO memory may become greater than the amount of data output from the shaping FIFO memory. In such a case, the storage region of the shaping FIFO memory temporarily becomes full. This may result in a dropout error of, for example, the packet data in the shaped reception data Dsu, as shown in FIG. 4.

The present invention provides a semiconductor device with an improved reception port for receiving packet data in accordance with the IEEE 1394 standard.

One aspect of the present invention is a semiconductor device for receiving reception data. The semiconductor device includes a synchronization memory for receiving reception data in accordance with a reception clock signal and synchronizing the reception data with an internal clock signal to generate synchronized reception data. A decoder, connected to the synchronization memory, decodes the synchronized reception data to generate decoded reception data. A shaping memory, connected to the decoder, for outputting the decoded reception data at a fixed timing.

Another aspect of the present invention is a semiconductor device for receiving reception data. The semiconductor device includes a decoder for receiving reception data in accordance with a reception clock signal and decoding the reception data to generate decoded reception data. A synchronization memory, connected to the decoder, synchronizes the decoded reception data with an internal clock signal to generate synchronized reception data. A shaping memory, connected to the synchronization memory, outputs the synchronized reception data at a fixed timing. The shaping memory includes a storage determination circuit for determining whether the reception data is data having a length that is not determined by a standard. The shaping memory further includes a reception data storage memory. A data storage unit stores part of the reception data having a length that is not determined by the standard in the reception data storage memory and stores all of the reception data having a length that is determined by the standard in the reception data storage memory based on the determination result of the storage determination circuit.

A further aspect of the present invention is a semiconductor device for receiving reception data. The semiconductor device includes a synchronization memory for receiving reception data in accordance with a reception clock signal and synchronizing the reception data with an internal clock signal to generate synchronized reception data. A decoder, connected to the synchronization memory, for decoding the synchronized reception data to generate decoded reception data. A shaping memory, connected to the decoder, for outputting the decoded reception data at a fixed timing. The shaping memory includes a storage determination circuit for determining whether the reception data is data having a length that is not determined by a standard. The shaping memory further includes a reception data storage memory. A data storage unit for storing part of the reception data having a length that is not determined by the standard in the reception data storage memory and storing all of the reception data having a length that is determined by the standard in the reception data storage memory based on the determination result of the storage determination circuit.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
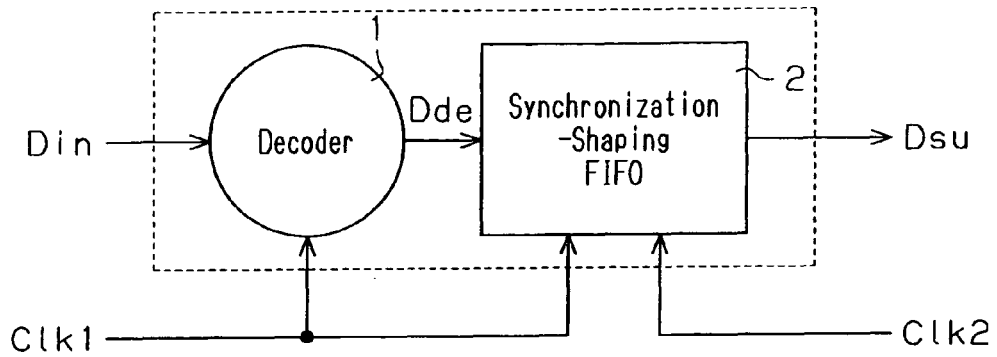
FIG. 1 is a schematic block diagram of a prior art reception port.
Figure 2:
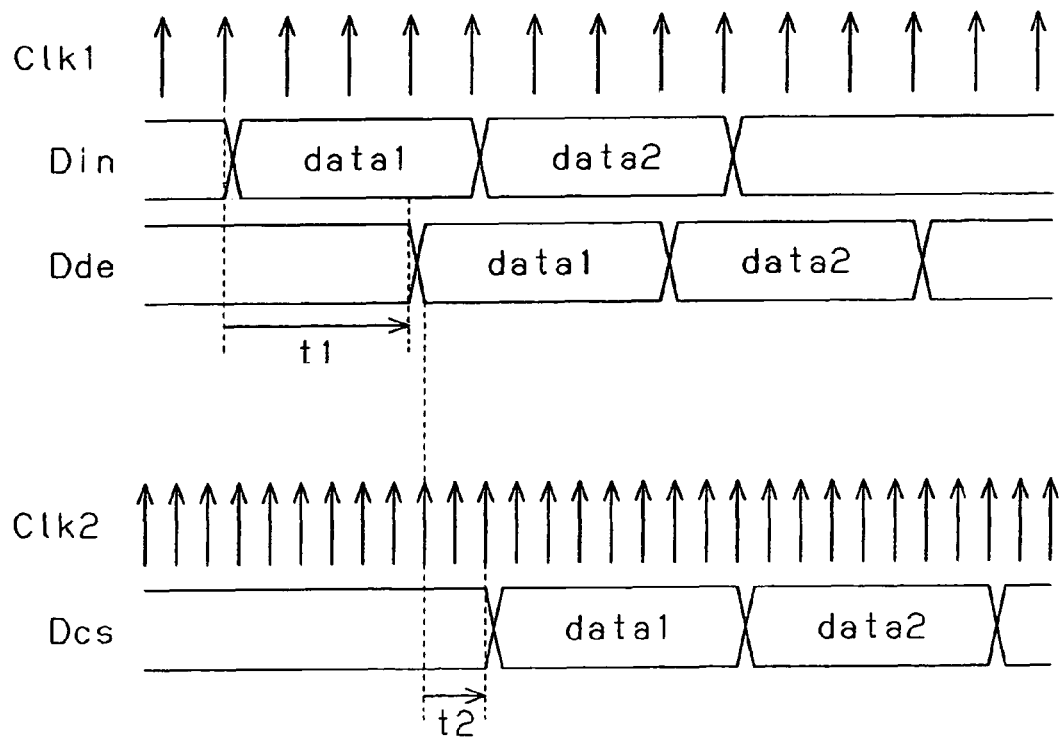
FIG. 2 is a waveform diagram showing the operation of the reception port of FIG. 1.
Figure 3:
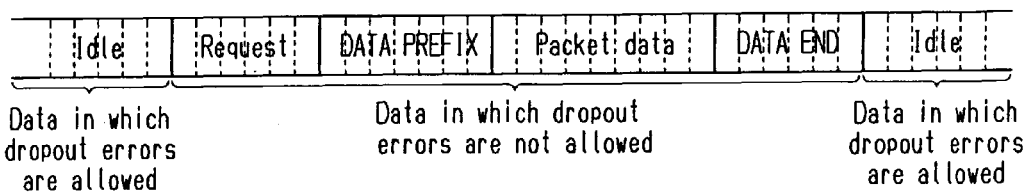
FIG. 3 is a diagram showing a data string of reception data in the reception port of FIG. 1.
Figure 4:
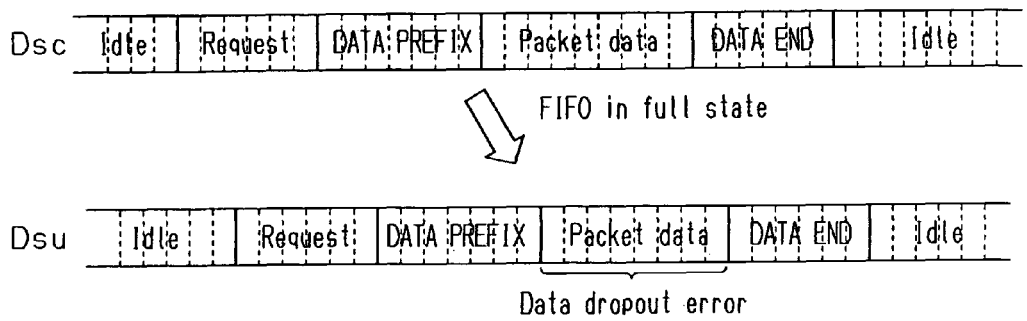
FIG. 4 is a diagram showing the operation of a shaping FIFO memory in the reception port of FIG. 1.
Figure 5:
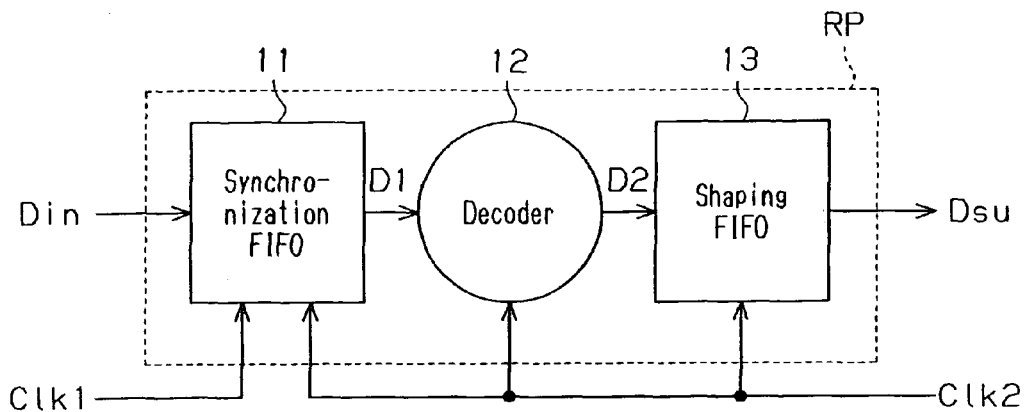
FIG. 5 is a schematic block diagram of a reception port according to a preferred embodiment of the present invention.

A reception port RP, which is a semiconductor device according to a preferred embodiment of the present invention, will now be described. FIG. 5 is a schematic block diagram of the reception port RP for receiving packet data in compliance with the IEEE 1394 standard. The reception port RP includes a synchronization FIFO memory 11, a decoder 12, and a shaping FIFO memory 13.

The synchronization FIFO memory 11 is provided with a reception clock signal clk1 and an internal clock signal clk2. The decoder 12 and the shaping FIFO memory 13 are provided with the internal clock signal clk2.

The synchronization FIFO memory 11 receives reception data Din and synchronizes the reception data Din with the internal clock signal clk2 prior to a decoding process. The decoder 12 decodes the synchronized reception data Din. The shaping FIFO memory 13 shapes the decoded reception data and provides an internal circuit with the shaped reception data having a fixed byte length.

Figure 6:
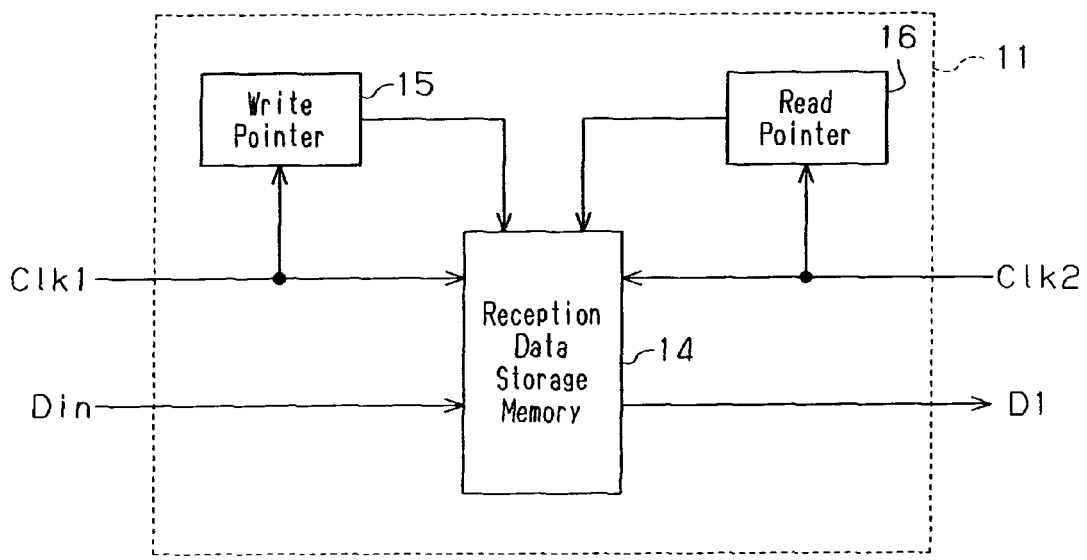
FIG. 6 is a schematic block diagram of a synchronization FIFO memory in the reception port of FIG. 5.

FIG. 6 is a schematic block diagram of the synchronization FIFO memory 11. The synchronization FIFO memory 11 includes a reception data storage memory 14, a write pointer 15, and a read pointer 16. The reception data storage memory 14 is formed by a first-in first-out (FIFO) memory. The reception data storage memory 14 receives the reception data Din and the reception clock signal clk1. The reception clock signal clk1 is also provided to the write pointer 15. The write pointer 15 generates a pointer value, or a write address, in response to the reception clock signal clk1. Then, the write pointer 15 provides the write address to the reception data storage memory 14. The reception data Din is sequentially written to the reception data storage memory 14 in accordance with the write address, which is set by the pointer value.

The reception data storage memory 14 is provided with the internal clock signal clk2. The internal clock signal clk2 is also provided to the read pointer 16. The read pointer 16 generates a pointer value, or a read address, in response to the internal clock signal clk2. Then, the read pointer 16 provides the read address to the reception data storage memory 14. The reception data Din stored in the reception data storage memory 14 is sequentially read in accordance with the read address, which is set by the pointer value. This operation outputs the reception data D1, which is synchronized with the internal clock signal clk2, from the reception data storage memory 14.

Figure 7:
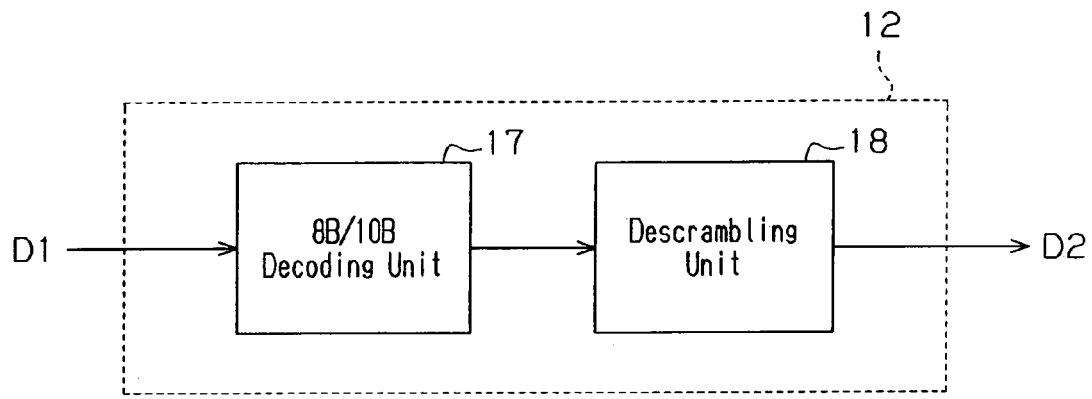
FIG. 7 is a schematic block diagram of a decoder in the reception port of FIG. 5.

FIG. 7 is a schematic block diagram of the decoder 12. The decoder 12 includes a decoding unit 17 and a descrambling unit 18. The reception data D1 is provided to the decoding unit 17. The decoding unit 17 performs a decoding process on the reception data D1 to decode the reception data D1, which is coded as a 10-bit signal. The decoding unit 17 then provides the decoded reception data as an 8-bit signal to the descrambling unit 18. The descrambling unit 18 descrambles the decoded reception data, and provides the descrambled reception data D2 to the shaping FIFO memory 13.

The synchronization FIFO memory 11 and the decoder 12 are configured in the same manner as those in the prior art example.

Figure 8:
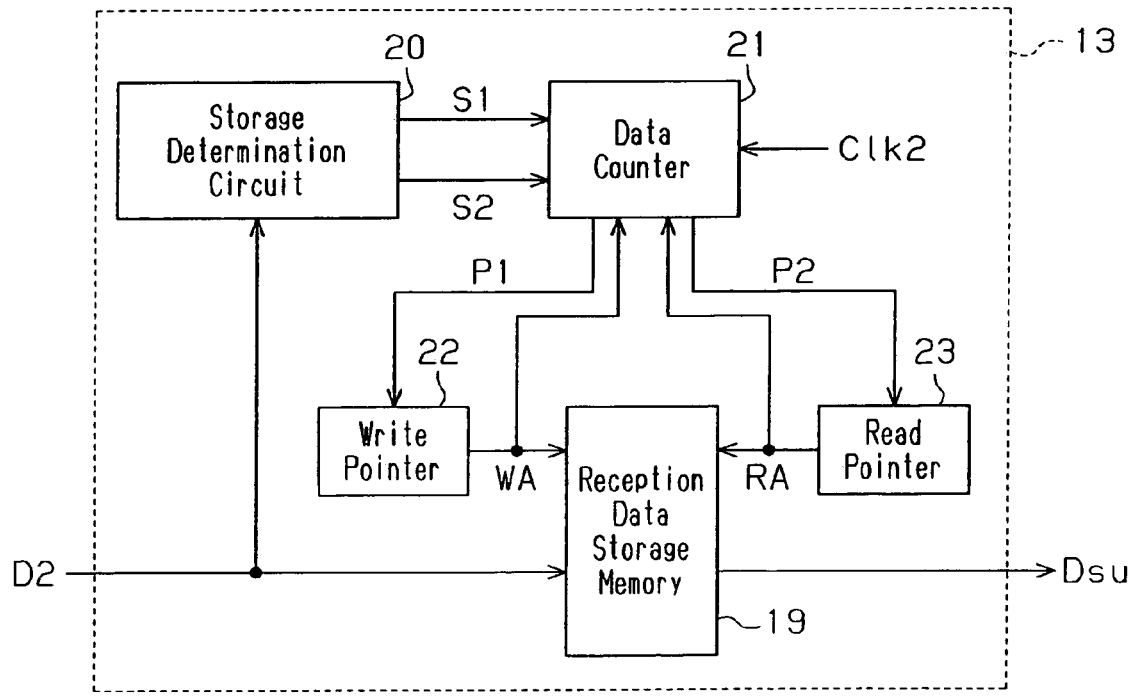
FIG. 8 is a schematic block diagram of a synchronization FIFO memory in the reception port of FIG. 5.

FIG. 8 is a schematic block diagram of the shaping FIFO memory 13. The shaping FIFO memory 13 includes a reception data storage memory 19, a storage determination circuit 20, a data counter 21, a write pointer 22, and a read pointer 23. The reception data D2 output from the decoder 12 is provided to the reception data storage memory 19. The reception data storage memory 19 is formed by a first-in first-out (FIFO) memory.

The reception data D2 is also provided to the storage determination circuit 20. The storage determination circuit 20 determines whether the data string provided as the reception data D2 is control data (idle signal and request signal) having data length that is not standardized. When the data is control data, the storage determination circuit 20 determines, for example, that the second and subsequent bytes of the data from when the reception of the data starts does not have to be stored. In this case, the storage determination circuit 20 provides a determination result S1 to the data counter 21.

When the data string provided as the reception data D2 is data having a standardized data length, such as DATA PREFIX, packet data, or DATA END, a dropout error in the data is not allowed. Thus, the storage determination circuit 20 determines that the data must be stored. In this case, the storage determination circuit 20 provides a determination result S2 to the data counter 21 (data storage means).

The data counter 21 performs a count operation in response to the internal clock signal clk2. If the determination result S1 is received, the data counter 21 provides the write pointer 22 with a write enable signal P1 only when receiving the first byte of the data that does not have to be stored. As a result, the reception data storage memory 19 stores only the first byte of the data that does not have to be stored. If the determination result S2 is received, the data counter 21 provides the write pointer 22 (data storage unit) with a write enable signal P1 when receiving each byte of the data that has to be stored.

The data counter 21 provides the read pointer 23 (data storage means) with a read enable signal P2 after the time required for storing, for example, four bytes of data in the reception data storage memory 19 elapses from when the determination results S1 and S2 are received.

The write pointer 22 provides the reception data storage memory 19 and the data counter 21 with a pointer value WA in response to the write enable signal P1 provided from the data counter 21. The write pointer 22 increments the pointer value WA whenever provided with the write enable signal P1. The reception data storage memory 19 generates a write address in response to the pointer value WA from the write pointer 22.

The read pointer 23 provides the reception data storage memory 19 and the data counter 21 with a pointer value RA in response to the read enable signal P2 provided from the data counter 21. The read pointer 23 increments the pointer value RA whenever provided with the read enable signal P2. The reception data storage memory 19 generates a read address in response to the pointer value RA from the read pointer 23.

The reception data storage memory 19 stores reception data at an address determined based on the pointer value from the write pointer 22, reads data stored at an address determined based on the pointer value from the read pointer 23, and outputs the shaped reception data Dsu.

Figure 9:
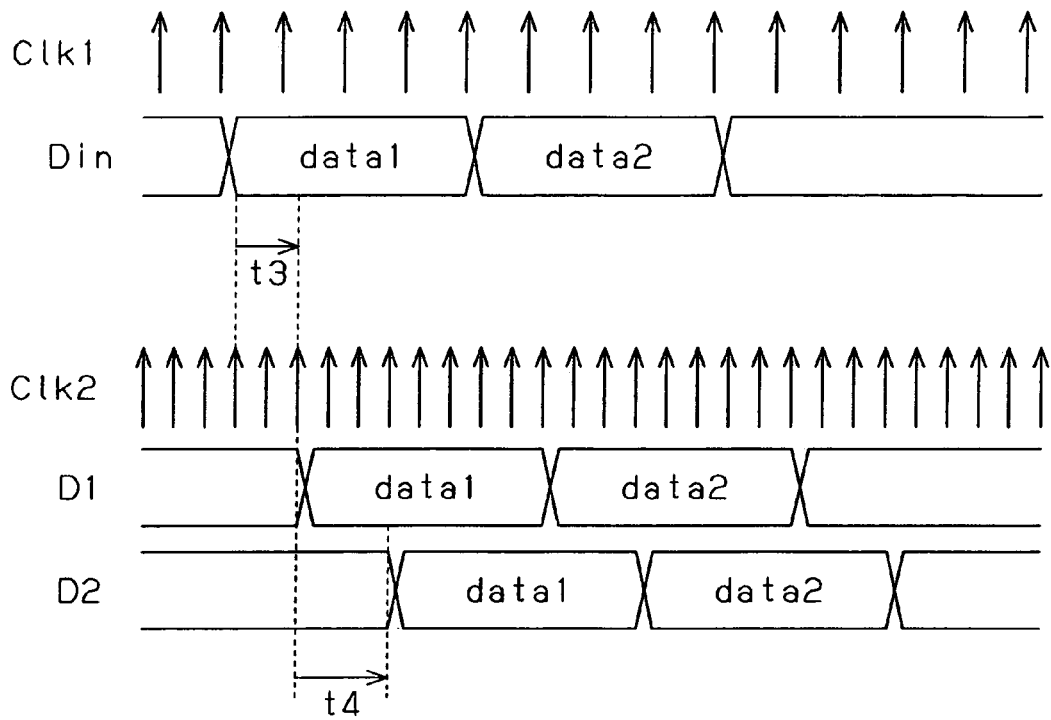
FIG. 9 is a waveform diagram showing the operations of the synchronization FIFO memory and the decoder in the reception port of FIG. 5.

Next, the operation of the reception port RO will be described. FIG. 9 is a waveform diagram showing the operation timings of the synchronization process performed by the synchronization FIFO memory 11 and the operation timings of the decoding process performed by the decoder 12.

The synchronization FIFO memory 11 is provided with the reception data Din in synchronization with the reception clock signal clk1. The synchronization FIFO memory 11 synchronizes the reception data Din with the internal clock signal clk2, and provides the synchronized reception data D1 to the decoder 12. The synchronization process is performed during time t3, which corresponds to two cycles of the internal clock signal clk2.

The decoder 12 decodes the synchronized reception data D1 and provides the decoded reception data D2 to the shaping FIFO memory 13. The decoding process is performed during time t4, which corresponds to three cycles of the internal clock signal clk2.

Figure 10:
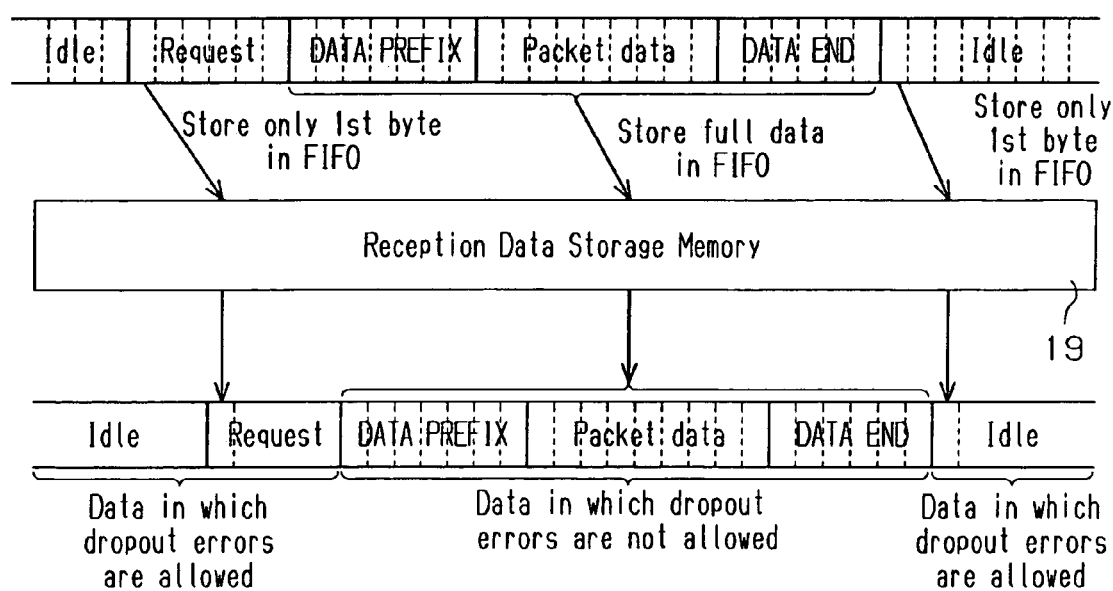
FIG. 10 is a diagram showing the operation of the shaping FIFO memory in the reception port of FIG. 5.

FIG. 10 is a diagram showing the operation for storing the reception data D2 in the reception data storage memory 19 of the shaping FIFO memory 13.

When an idle signal or a request signal having a length that is not standardized is provided to the shaping FIFO memory 13, only the first byte of the idle signal or the request signal is stored in the reception data storage memory 19 of the shaping FIFO memory 13.

When DATA PREFIX, packet data, or DATA END, of which dropout errors are not allowed, are provided to the shaping FIFO memory 13, each byte of the DATA PREFIX, the packet data, or the DATA END is sequentially stored in the reception data storage memory 19.

Figure 11:
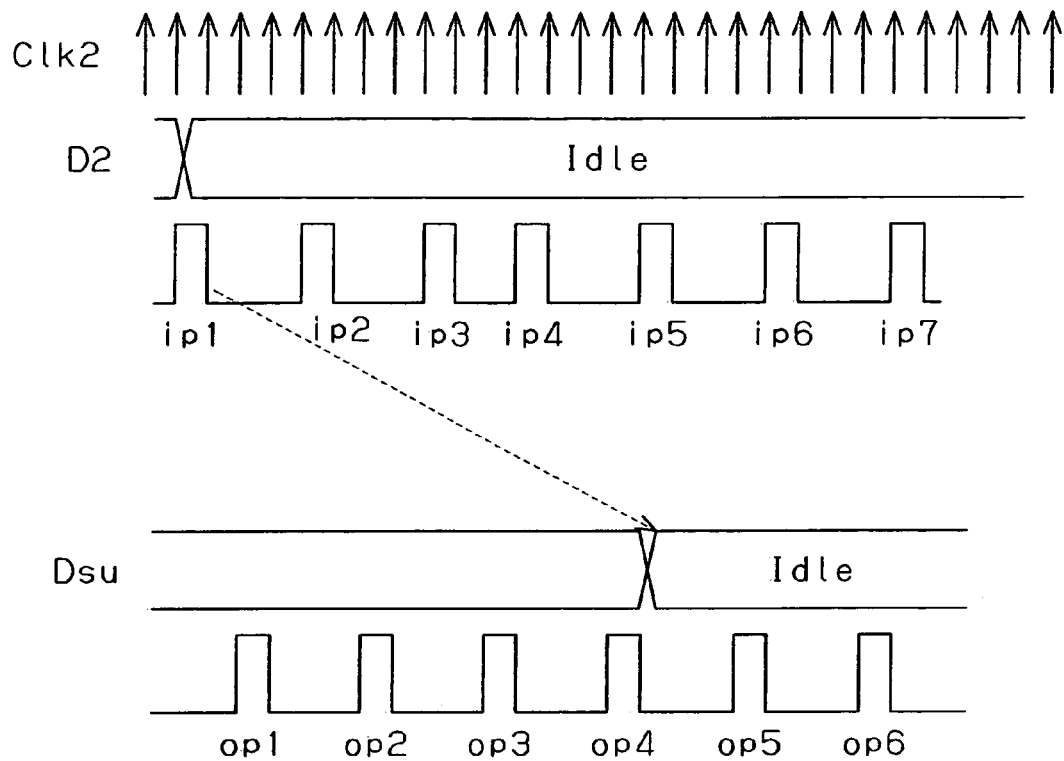
FIG. 11 is a waveform diagram showing the operation of the shaping FIFO memory of FIG. 5.

FIG. 11 is a waveform diagram showing the relationship between the input timing at which the reception data D2 is input into the shaping FIFO memory 13 and the output timing at which the shaped reception data Dsu is output from the shaping FIFO memory 13.

The shaping FIFO memory 13 receives the reception data D2, for example, at a rate of one byte for every four cycles of the internal clock signal clk2. Each byte of the reception data D2 is sequentially provided to the shaping FIFO memory 13 at input timings ip1 to ipn.

When the data string of the reception data D2 is control data (idle signal) having a length that is not standardized, only the first byte of the reception data D2, which is provided at the input timing ip1, is stored in the reception data storage memory 19. The cycles of the input timings ip1 to ipn does not necessarily have to be fixed and may vary when the timings of the reception clock signal clk1 and the internal clock signal clk2 deviate from each other.

The shaped reception data Dsu is output from the shaping FIFO memory 13 one byte at a time at the fixed output timings op1 to opn. After the shaping FIFO memory 13 receives the fourth byte of the reception data D2 at input timing ip4, the first byte of the reception data D2 stored in the reception data storage memory 19 is output as the shaped reception data Dsu at output timing op4.

The reception port RP of the preferred embodiment has the advantages described below.

(1) The reception port RP synchronizes the reception data Din, which is provided in synchronization with the reception clock signal clk1, with the internal clock signal clk2. Further, the reception port RP decodes the synchronized reception data D1 in accordance with the internal clock signal clk2. Thus, when the frequency of the internal clock signal clk2 is higher than the frequency of the reception clock signal clk1, the time required for the decoding process is shortened. This shortens the repeat time required for transferring the reception data.

(2) The decoding process is performed based on the internal clock signal clk2. Thus, the time required for the decoding process is fixed regardless of changes in the reception clock signal clk1, that is, even if there is a change in the transmission device.

(3) Only the first byte of control data, such as the idle signal or the request signal having a length that is not standardized, is stored in the reception data storage memory 19 of the shaping FIFO memory 13. This produces empty space in the storage region of the reception data storage memory 19. Thus, even when the timing at which data is stored in the shaping FIFO memory deviates from the timing at which data is output from the shaping FIFO memory, dropout errors of the DATA PREFIX, the packet data, and the DATA END are prevented during data storage.

It should be apparent to those skilled in the art that the present invention may be embodied in many other specific forms without departing from the spirit or scope of the invention. Particularly, it should be understood that the present invention may be embodied in the following forms.

The storage determination circuit 20 may determine that the third and subsequent bytes of the control data do not have to be stored.

In the preferred embodiment, the shaped reception data Dsu is output from the shaping FIFO memory 13 after time for receiving four bytes of data elapses from when the shaping FIFO memory 13 receives the reception data D2. However, the shaped reception data Dsu may be output after time for receiving any number of bytes elapses as long as the shaped reception data Dsu can be output in fixed cycles.

Figure 12:
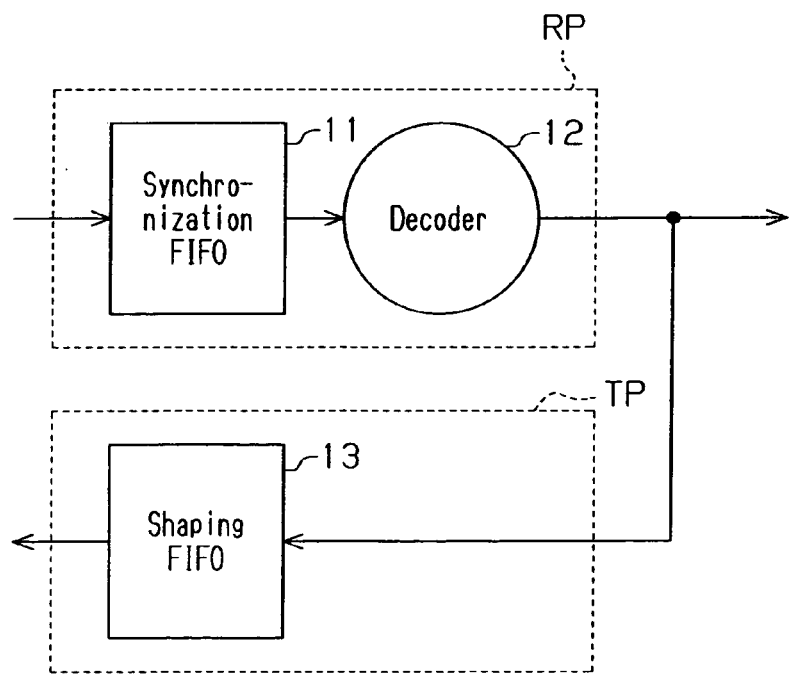
FIG. 12 is a schematic block diagram of a reception port according to a further embodiment of the present embodiment.

As shown in FIG. 12, the shaping FIFO memory 13 may be incorporated in a transmission port TP.

The semiconductor device of the present invention may have the structure described below.

A semiconductor device for receiving reception data includes a decoder for receiving the reception data in accordance with a reception clock signal and decoding the reception data to generate decoded reception data. A synchronization memory, connected to the decoder, synchronizes the decoded reception data with an internal clock signal to generate synchronized reception data. A shaping memory, connected to the synchronization memory, outputs the synchronized reception data at a fixed timing. The shaping memory includes a storage determination circuit 20 for determining whether the reception data is data having a length that is not standardized. Further, the shaping memory includes a reception data storage memory 19. Data storage unit (21, 22, and 23) stores part of the reception data having a length that is not standardized in the reception data storage memory and stores all of the reception data having a standardized length in the reception data storage memory based on the determination result of the storage determination circuit.

The present examples and embodiments are to be considered as illustrative and not restrictive, and the invention is not to be limited to the details given herein, but may be modified within the scope and equivalence of the appended claims.

What is claimed is:

1. A semiconductor device for receiving reception data, the semiconductor device comprising:
    a synchronization memory for receiving reception data in accordance with a reception clock signal and synchronizing the reception data with an internal clock signal to generate synchronized reception data;
    a decoder, connected to the synchronization memory, for decoding the synchronized reception data in accordance with the internal clock signal to generate decoded reception data; and
    a shaping memory, connected to the decoder, for receiving the decoded reception data in accordance with the internal clock signal and outputting the decoded reception data at a fixed timing, wherein the frequency of the internal clock signal is higher than the frequency of the reception clock signal, and wherein when the decoded reception data has a length that is not determined by a standard, the shaping memory stores part of the decoded reception data.

2. The semiconductor device according to claim 1, wherein each of the synchronization memory and the shaping memory includes a first-in first-out memory.

3. The semiconductor device according to claim 1, further comprising:
    a reception port including the synchronization memory, the decoder, and the shaping memory.

4. The semiconductor device according to claim 1, further comprising:
    a reception port including the synchronization memory and the decoder; and
    a transmission port including the shaping memory.

5. A semiconductor device for receiving reception data, the semiconductor device comprising:
    a decoder for receiving reception data in accordance with a reception clock signal and decoding the reception data to generate decoded reception data;
    a synchronization memory, connected to the decoder, for synchronizing the decoded reception data with an internal clock signal to generate synchronized reception data; and
    a shaping memory, connected to the synchronization memory, for outputting the synchronized reception data at a fixed timing, the shaping memory including:
        a storage determination circuit for monitoring all of reception data and determining whether the reception data is data having a length that is not determined by a standard;
        a reception data storage memory; and
        a data storage unit for limiting the length of data to be stored for the reception data having a length that is not determined by the standard and storing part of the reception data having a length that is not determined by the standard in the reception data storage memory and storing all of the reception data having a length that is determined by the standard in the reception data storage memory based on the determination result of the storage determination circuit.

6. The semiconductor device according to claim 5, wherein each of the synchronization memory and the shaping memory includes a first-in first-out memory.

7. The semiconductor device according to claim 5, wherein the standard is the IEEE 1394 standard.

8. A semiconductor device for receiving reception data, the semiconductor device comprising:
    a synchronization memory for receiving reception data in accordance with a reception clock signal and synchronizing the reception data with an internal clock signal to generate synchronized reception data;
    a decoder, connected to the synchronization memory, for decoding the synchronized reception data to generate decoded reception data; and
    a shaping memory, connected to the decoder, for outputting the decoded reception data at a fixed timing, the shaping memory including:
        a storage determination circuit for monitoring all of reception data and determining whether the reception data is data having a length that is not determined by a standard;
        a reception data storage memory; and
        a data storage unit for limiting the length of data to be stored for the reception data having a length that is not determined by the standard and storing part of the reception data having a length that is not determined by the standard in the reception data storage memory and storing all of the reception data having a length that is determined by the standard in the reception data storage memory based on the determination result of the storage determination circuit.

9. The semiconductor device according to claim 8, wherein each of the synchronization memory and the shaping memory includes a first-in first-out memory.

10. The semiconductor device according to claim 8, wherein the standard is the IEEE 1394 standard.

11. The semiconductor device according to claim 8, wherein the data storage unit includes:
    a data counter for generating a write enable signal and a read enable signal based on the determination result of the storage determination circuit;

a write pointer for generating a first pointer value in response to the write enable signal and providing the first pointer value to the reception data storage memory to store the reception data in the reception data storage memory; and a read pointer for generating a second pointer value in response to the read enable signal and providing the second pointer value to the reception data storage memory to read the reception data from the reception data storage memory at a fixed timing.

12. The semiconductor device according to claim 11, wherein the data counter stops generating the write enable signal when the storage determination circuit determines that second and subsequent bytes of the reception data having a length that is not determined by the standard have been received.

13. The semiconductor device according to claim 11, wherein the data counter provides a read enable signal to the read pointer after time required for storing data having a predetermined number of bytes in the reception data storage memory elapses from when the determination result is received from the storage determination circuit.

14. The semiconductor device according to claim 13, wherein the predetermined number of bytes is four bytes.

* * * * *